United States Patent Office 3,567,487
Patented Mar. 2, 1971

3,567,487
METALLIZABLE POLYOLEFINS
Wassily Poppe and Habet M. Khelghatian, Springfield, Pa., assignors to Avisun Corporation, Philadelphia, Pa.
No Drawing. Filed Jan. 6, 1969, Ser. No. 789,422
Int. Cl. B44d 1/92; C23c 17/00
U.S. Cl. 117—47
19 Claims

ABSTRACT OF THE DISCLOSURE

Metallizable polyolefin compositions are provided from blends of a polyolefin and from about 1% to about 55% by weight of a compatible adhesion-promoting modifier selected from the group consisting of (a) polyterpene resins, (b) rosins, (c) disproportionated rosins, (d) polymerized rosins, (e) hydrogenated rosins, (f) dirosin amines, (g) rosin amides, (h) ester gums, and (i) petroleum resins having a molecular weight less than about 3,000. The polyolefin compositions may be metallized by conventional electroplating or other metallizing processes to form metallized shaped articles.

BACKGROUND OF THE INVENTION

This invention is directed to the preparation of modified polyolefin compositions that may be metallized by known processes to achieve an adherent bond of the metal to the polyolefin substrate. It is well known that plated metal coatings fail to firmly adhere to unmodified polyolefin surfaces. Many processes have been described in the literature that deal with the problem of adherability of metallic coatings to non-conductive surfaces of synthetic polymeric materials. In general, one approach to solving this problem has been to modify the surface of the polyolefin by various surface oxidation processes. For example, the polyolefin article may be chemically etched in an acidic conditioning bath. Other processes have involved a mechanical treatment such as roughening of the polymer surface to provide a substrate of increased surface area that will aid in bonding the deposited metal to the polymer article. Still other processes that aid in improving the bond strength between the metal layer and the polymer article involve application of various adhesives layers to the surface of the polymer article.

Metallizing polyolefin articles in such a manner that the deposited metal is firmly bonded to the polyolefin substrate is very desirable especially in view of recently developed polyolefins that are considered engineering plastics and which may be used as substitutes for various construction materials. A metallized coating having good adhesion to the polyolefin substrate improves the structural properties of the plastic such as resistance to deformation and thereby enhances the use of metallizable polyolefins as a substitute for heavier base materials. Metallized polyolefins provide numerous advantages over plated metals and the most obvious advantage is the reduction in weight. Another is the elimination of highly corrosive bases or substrates. Frequently, a metallized polyolefin article is substituted for an equivalent metal part since tooling costs and finishing costs of buffing and polishing are reduced. In many cases, the speed of molding or casting coupled with the elimination of buffing are important considerations. Good adhesion between the metal coating and the polyolefin substrate improves physical properties such as hardness, abrasion resistance, impact strength, temperature deflections and flexural modulus. Metallized polyolefins may be applied in a wide variety of industrial uses in the automotive, appliance, plumbing, electronic, builders' hardware and other industries.

Polyterpenes, petroleum resins and certain rosin derivatives have been incorporated into polyolefins to prepare heat sealable, self-supporting films that are described in U.S. Pat. Nos. 3,278,646 and 3,313,754 and British patent specification No. 1,024,718.

SUMMARY OF THE INVENTION

It is an object of this invention to provide solid, substantially crystalline polyolefin compositions that may be metallized to obtain an adherent bond between the metal and the polyolefin substrate. It is a further object of this invention to provide solid, substantially crystalline polyolefin compositions that may be electroplated by a fast plating cycle. These and other objects of the invention are accomplished by blending into said polyolefin a compatible, thermoplastic, resinous adhesion-promoting modifier in an amount of about 1% to about 55% by weight and preferably about 2.5% to about 15% by weight, based on the total weight of the polyolefin composition. Adhesion-promoting modifiers include: (a) polyterpene resins, (b) rosins, (c) disproportionated rosins, (d) polymerized rosins, (e) hydrogenated rosins, (f) dirosin amines, (g) rosin amides, (h) ester gums, and (i) petroleum resins having a molecular weight less than about 3,000. The polyolefins that may be modified include those polymers derived from 1-alkenes having from 2 to 8 carbon atoms.

DESCRIPTION OF THE INVENTION

The polyolefins treated according to this invention include polymers which contain a major proportion (i.e., greater than 50%) of an aliphatic olefin having from 2 to 8 carbon atoms. Such polyolefins, therefore, include polyethylene, polypropylene, ethylene propylene block or random copolymers, ethylene butene-1 block or random copolymers, polybutene-1, poly(4-methylpentene-1), poly (3-methylbutene-1), and the like. The term polyolefin as used herein is, furthermore, intended to include copolymers of hydrocarbon monomers with copolymerizable polar monomers in which such functional monomers constitute a minor proportion of the copolymer. Functional monomers frequently employed in combination with hydrocarbon monomers are in particular the acrylic monomers such as methyl methacrylate, ethyl acrylate, and acrylonitrile and the vinyl esters such as vinyl acetate. Particularly useful polyolefins are those that are substantially crystalline polymers derived from 1-alkenes having from 3 to 8 carbon atoms i.e., polymers containing at least 25%, and preferably at least 50% crystallinity as determined by density-crystallinity relationships, a type of technique described by J. A. Gailey et al., SPE Technical papers (ANTEC), Vol. IX, Session IV–1, pages 1 to 4, February 1963.

The polyolefins may contain fillers, stabilizers, plasticizers, and other additives as needed for particular applications. Commonly employed mineral fillers that may be incorporated into the polyolefin compositions include talc, titanium dioxide, calcium carbonate, bentonite, clay, wood flour and asbestos fiber. Although employingg a filler in a polyolefin composition is optional, the filler appears to provide the additional benefit of aiding substantially uniform incorporation of the thermoplastic resinous modifier throughout the polyolefin composition.

Additional additives that may be incorporated into the polyolefin composition to promote adhesion of the deposited metal to the polyolefin substrate include surfactants such as the nonionic alkylphenoxypolyalkoxyalkanols having alkyl groups of about 7 to 12 carbon atoms and from about 6 to 60 alkoxy groups. Representative surfactants include octylphenoxypolyethoxyethanols, heptylphenoxypolyethoxyethanols and nonylphenoxypolyethoxyethanols. When used, the surfactants may comprise from about 0.1% to 2% by weight of the polyolefin.

Adherability of the metal layer to the polyolefin base member is accomplished by blending into the polyolefin from about 1% to about 55% by weight, based on the total weight of the polyolefin composition of a compatible, thermoplastic resinous adhesion-promoting modifier having an average number molecular weight less than about 5,000 and preferably less than about 3,000. In addition, said adhesion-promoting modifier should have a softening point (Ring and Ball method) not less than about 65° C.

The polyterpene resins may be prepared by the catalytic polymerization of a monocyclic, dicyclic, or acyclic terpene or mixtures thereof. Representative polymerizable terpenes include alpha-pinene, beta-pinene, dipentene, terpinene, myrcene and so on. Effective catalysts that initiate polymerization include anhydrous aluminum trichloride, sulfuric acid, boron trifluoride and the like. Polyterpene resins are a well-known class of thermoplastic materials and are described in Polymers and Resins, by B. Golding, pages 536–8, published by D. Van Nostrand Co., Inc.; New York (1959).

In one known procedure for producing polyterpene resins, alpha-pinene is diluted with a refined hydrocarbon solvent, such as a naphtha cut and contacted with a Friedel-Crafts catalyst. After the initial heat evolution reactions have subsided, an additional contacting period with the catalyst is provided. The catalyst is removed by successive washings with water and dilute aqueous alkali and separation of the aqueous and hydrocarbon phases. The hydrocarbon phase is then subjected to high temperature and steam distillation and the pinene resin is recovered.

Adhesion-promoting modifiers that may be used in this invention include rosins (rosin acids) and various rosin derivatives that have a softening point of at least about 65° C. and are compatible with polyolefins. Among the rosin derivatives that may be used are disproportionated rosin, polymerized rosin, hydrogenated rosin, rosin amides, dirosin amine and ester gums. An extensive discussion of resinous rosin derivatives may be found in the Encyclopedia of Chemical Technology, Volume 11, pages 779–810, Copyright 1953 by Interscience Encyclopedia, Inc.

Rosin is a component of the resinous exudation of many pine trees throughout the world. It is recovered and decolorized by well-known methods. American gum and wood rosins as well as tall oil rosins may be composed of about 90% rosin acids and about 10% of non-acidic resins such as terpenes. Abietic acid is one of the principal components of processed rosin and these type acids readily oxidize due to conjugated unsaturation. Stabilization is accomplished by such processes as hydrogenation, disproportionation and polymerization as well as the formation of adducts with rosin or other materials. Rosin may be polymerized by alkyl or metal halides at room temperature. Hydrogenated resin may be defined for purposes of this invention as partially or fully hydrogenated rosin.

Tall oil rosin is the rosin obtained from the tall oil refining operation, during which practically all of the fatty acids also present in the tall oil are removed by fractional distillation. Gum rosin may be obtained by refining the crude gum or oleoresin from living pine trees. Wood rosin may be derived from aged pine wood.

Disproportionated rosins may be produced by removal of two hydrogen atoms from the unsaturated resin acids in rosin and rearrangement of the double bonds to form an aromatic nucleus thus improving the stability of the rosin by removal of the easily oxidized unsaturation. The disproportionation can be brought about by mineral acid or heating at 270° C. for long periods.

The polymerized rosins are also more stable than rosin per se because the polymerization takes place in the double bonds of the resin acids. Generally the polymerization is conducted at room temperature over long periods of time with a catalyst of alkyl halides, metal halide or inorganic acids.

The hydrogenated rosins used in the invention are usually produced from wood and gum rosins. The purpose of the hydrogenation is to reduce the susceptibility of the rosin to air oxidation. This is achieved by hydrogenation of the resin acids in the rosins. A large proportion of the resin acids in rosin contain two double bonds thus, it is the hydrogenation of these double bonds that is the desired result of hydrogenation. Generally the first double bond is hydrogenated with ease, the residual double bond being highly resistant to further hydrogenation or air oxidation. Satisfactory stability is obtained by hydrogenation to the "dihydro stage." This type of hydrogenation may be carried out by passing the molten rosin over Raney nickel catalyst at high pressure and temperature for long periods of time, for example, 125 atmospheres hydrogen pressure at 230° C. for five hours and the resulting hydrogenated rosin is suitable for this invention. More drastic conditions are employed to hydrogenate to the "tetrahydro stage."

Dirosin amine may be prepared by the hydrogenation of a rosin nitrile over a nickel catalyst at temperatures above about 200° C. with removal of ammonia. An alternative procedure is to heat rosin amine in the presence of a nickel catalyst and to remove ammonia as it is formed.

The rosin amides useful in this invention may be rosin monoamides or rosin diamides. The monoamides may be prepared by reacting a rosin (rosin acids) or a modified rosin such as hydrogenated rosin, polymerized rosin or disproportionated rosin with an amine derived by the ammonolysis of a rosin or modified rosin. Rosin diamides may be prepared by reacting ethylene diamine with a rosin or any of the aforementioned modified rosins at high temperatures in the range of 250°–300° C. under high vacuum to remove volatile by-products.

Ester gums may be defined as the synthetic resin product obtained by the esterification of rosin with a polyhydric alcohol such as ethylene glycol, glycerol, pentaerythritol, diethylene glycol, triethylene glycol or sorbitol. Representative ester gums are the glycerol ester or hydrogenated rosin, the ethylene glycol ester of hydrogenated rosin, the diethylene glycol ester of hydrogenated rosin, the glycerol ester of polymerized rosin and the diethylene glycol ester of polymerized rosin.

Low molecular weight petroleum resins derived from deeply-cracked petroleum distillates represent another class of resinous modifiers that may be incorporated into the polyolefin compositions. Petroleum hydrocarbon resins are formed by the polymerization of petroleum olefins and diolefins of the low boiling types removed from cracked petroleum distillates in gasoline manufacturing. These resins have a large number of chemical constituents and are not readily represented by conventional structural formulae. Petroleum hydrocarbon resins are well-known materials and are described in detail in the Kirk-Othmer Encyclopedia of Chemical Technology, Second Edition; Volume 11; pages 242–262; copyright 1966; John Wiley and Sons; New York. The petroleum resins employed as modifiers in the polyolefin compositions will have an average molecular weight less than about 3,000 and usually below about 2,000. These resins may be further characterized in that their softening points are generally below about 145° C. and for purposes of this invention the minimum softening point is about 65° C. The petroleum hydrocarbon resins may be modified with minor amounts of polar monomers such as acrylonitrile. Thus a styrene-acrylonitrile-indene terpolymer is considered a modified petroleum resin.

The term "petroleum resin" as used herein is intended to include hydrogenated petroleum hydrocarbon resins. The hydrogenation of the petroleum resin can be carried out by using a catalyst such as nickel, palladium on carbon or platinum on alumina and preferably the reaction is conducted in the presence of a solvent such as toluene utilizing high pressures and temperatures between 150° and 300° C.

The technical descriptions in the aforementioned patent, textbook and encyclopedic references together with the publications listed in the bibliographies of these authorities are hereby incorporated into this disclosure.

The polyolefin and the compatible, thermoplastic, resinous, adhesion-promoting modifier together with other optional additives may be blended by conventional techniques. For instance, the polyolefin and the thermoplastic resinous modifier may be melt blended and mechanically stirred in such equipment as extruders, stirred mixers or milling rolls and then formed, with cooling, into molded, shaped articles that may subsequently be metallized. Also, the polyolefin and modifier in pulverulent form may be dry blended. Alternatively, the polyolefin and the resinous modifier may be dissolved together in a hydrocarbon solvent and precipitated by cooling or by an anti-solvent or by both methods. Another technique useful in blending is to dissolve the components in a hot hydrocarbon solvent such as n-heptane followed by evaporation of the solvent. Following blending, the composition is prepared for a molding or melt-extrusion procedure and a shaping and cooling technique.

The modified polyolefins of the present invention are shaped into the article desired to be metallized by any of the means heretofore employed for the preparation of such articles inclusive of which are compression molding and injection molding.

Although a variety of processes have been developed for metallizing of non-conductive surfaces and in particular, plastics, electroplating and vacuum metallizing are the most common. Although various commercial processes are employed to electroplate a non-conductive substrate, the same general steps are usually employed and these involve conditioning the base member, sensitizing, activating, applying an electroless copper conductor and thereafter electroplating a finish metal to the polyolefin base member. Thus, the plating of articles made from the modified polyolefins of the present invention is generally conducted using the following steps:

(1) The surface to be plated is cleaned using a mild alkaline bath to remove oils, mold release agents and fingerprints.

(2) The alkaline material retained by the surface is neutralized using a mild acid.

(3) The clean surface is then chemically etched with a conditioner containing concentrated mineral acid such as sulfuric acid and chromic trioxide or a chromate.

(4) The resulting etched surface is sensitized with a readily oxidizable tin salt solution such as stannous chloride which causes tin to be absorbed on the surface.

(5) The surface is then activated or nucleated by treatment with an aqueous solution of a noble metal salt such as palladium chloride which forms a metallic film at discrete activated sites.

(6) The activated surface is subjected to electroless plating using copper, nickel, or cobalt as the metal. This is accomplished by immersing a treated surface in a solution of such metal salt containing in addition to the metal salt such as copper sulfate or nickel chloride, a reducing agent such as formaldehyde, trioxymethylene and the like. Sufficient copper, nickel or cobalt is deposited on the surface of the polyolefin article to achieve a continuous coating capable of conducting electricity.

(7) The electrodeposition of metal is then followed by conventionally plating of the surface with a finish metal such as copper, nickel and/or chromium or just nickel and chromium. The thickness of the electroplated coating is generally within the range of 0.1 to 1.5 mil.

It is, furthermore, highly desirable if not essential to rinse and clean the surface being treated with water between each of the steps outlined and in some instances, it may also be desirable to dry the surface between the various treating steps. Since the various outlined steps employed in the electroplating of non-conducting surfaces and particularly plastic surfaces are well known in the electroplating art, no further description is deemed necessary for a full understanding of the present invention. The polyolefin compositions of the present invention can be employed in electroplating using any of the processes heretofore developed for electroplating plastic and particularly polyolefin surfaces.

Alternatively, a metallic coating may be applied to the polyolefin base member by vacuum metallizing. This well known and conventional procedure involves the principle of evaporation of metals under high vacuum. Representative of typical metals that may be applied using this technique include aluminum, copper and silver. Generally, vacuum metallizing involves the steps of (a) applying a suitable undercoat or prime coat to the polyolefin article, (b) evaporating the desired metal under high vacuum, and (c) applying a topcoat lacquer to protect the thin metallic deposit. Suitable undercoats that are applied to the polyolefin article are well known and are generally a dispersion or solution of an acid containing polymer such as carboxylated butadiene polymers, and maleic anhydride modified atatic polypropylene polymers. As the topcoat, any commercially available thermosetting acrylic lacquer may be used. The deposited metal film is thin and opaque, ranging from thicknesses of 0.15 micron to 1.0 micron.

The polyolefin compositions of the present invention are particularly suitable in the electroplating of articles made from the modified polyolefin described in this invention in that they give rise to a greatly improved bond strength between the metal plate and the polyolefin substrate. Although the adhesion of metal plate to the substrate can be measured by various tests, bond strength is preferably measured by the pull test in which two parallel cuts are made into the plated metal coating, ½ inch apart and an additional vertical cut is made to form a tab; one end of the resulting tab then being raised sufficiently to allow gripping by a tensile testing machine; the specimen is then placed into a tensile rig and the tab is pulled vertically from the surface. The force required to pull the tab is measured as the bond strength. For most applications a bond strength of 6 to 10 lbs./in. is adequate, but if the plated article in use is to be subjected to mechanical shock or extremes of temperature, bond strengths up to 25 lbs./in. or more may be desirable.

For purposes of illustrating the invention, the following examples are provided wherein, unless otherwise indicated, all parts and percentages are by weight:

EXAMPLE 1

A polymer composition is prepared by blending (a) 95 parts of a crystalline polypropylene homopolymer having a flow rate of 3.4 (ASTM–D–1238–62T) and containing 0.5% of dilauryl thiodipropionate, 0.2% of 2,6-ditertiary butyl 4-methyl phenol, 0.15% of calcium stearate and 5% of $TiO_2$, and (b) 5 parts of a thermoplastic polyterpene resin having a softening point (Ring and Ball) of 115° C. a capillary tube melting point of 95° C., and an acid number of approximately zero (commercially available from Heyden Newport Chemical Corporation as NIREZ 1115). The modifier was dry blended at room temperature with the polypropylene composition for 1½ hours and then melt extruded and ground into molding powder. Plaques, 5" x 5" x 110 mil, were compression molded by conventional apparatus.

The plaques were immersed consecutively in a conditioner consisting of 55% sulfuric acid (96% concentration), 10% potassium dichromate and 35% water for a period of 10 minutes at 80° C.; in a stannous chloride sensitizer solution containing per liter of solution 10 g. of $SnCl_2$ and 40 ml. of HCl at ambient temperatures of 1 to 3 minutes; in an activator solution containing per gallon of solution 1 g. of palladium chloride and 10 ml. of HCl for a period of 1 to 2 minutes at ambient temperatures; and in an electroless copper plating solution containing per liter of solution 29 g. of copper sulfate, 140 g. of Rochelle Salt, 40 g. of sodium hydroxide and 166 g. of formaldehyde (37% solution) at a temperature of 70° C. for a period sufficient to obtain a continuous coating capable of conducting electricity. Between each of the immersions described, the plaque is thoroughly rinsed with distilled water. The resulting plaque on washing with water was then electroplated with copper for about 20 minutes, at a current density of approximately 30 amps./sq. ft., resulting in about a 1 mil coating of copper on the plaque.

The bond strength of the electroplated metal to the polypropylene substrate was measured by the previously described bond strength test and the results averaged 19 lbs./in.

EXAMPLE 2

Ninety-five parts of a crystalline polypropylene homopolymer having a flow rate of 4.0 (ASTM–1238–62T) and containing 0.3% of dilauryl thiodipropionate, 0.2% of 2,6-ditertiary butyl 4-methyl phenol, 0.2% of calcium stearate, and 0.5% of a nonionic surfactant of t - octyl-phenoxypolyethoxyethanol having an average of ten polyethoxy units was dry blended with 5 parts by weight, based on the weight of the polypropylene composition, of a polyterpene resin having a softening point (Ring and Ball) of 85° C., a capillary tube melting point of 65° C. and an acid number of approximately zero. Plaques were molded from the blended composition and electroplated according to the process described in Example 1. Evaluation of the bond strength gave an average value of 20–22 lbs./in.

EXAMPLE 3

Ninety parts of a polymer composition of a crystalline propylene-ethylene terminal block copolymer having a flow rate of 4.0 and containing 0.3% of distearyl thiodipropionate, 0.2% of calcium stearate, 0.2% of 2,6 - ditertiary butyl 4 - methyl phenol and 5.0% of $TiO_2$ was modified by blending 10 parts of a polyterpene resin prepared by the catalytic polymerization with anhydrous aluminum chloride of a mixture of pinenes, principally beta pinene, obtained from Southern sulfate turpentine. The polyterpene resin had a softening point (Ring and Ball method) of approximately 125° C. and an acid number less than 4. The blended composition was molded into several plaques that were electroplated according to the procedure in Example 1. The average bond strength corresponded to the values obtained in Example 1.

EXAMPLE 4

The procedure of Example 3 was repeated with the exception that 75 parts of the same crystalline propylene-ethylene terminal block copolymer was dry blended with 25 parts of Piccolyte S–100 (available from Pennsylvania Industrial Chemical Corporation), a polyterpene resin having a Ring and Ball softening point of 100° C., an acid number less than 4 and a density of 0.97.

Plaques were molded and then electroplated according to the procedure of Example 1. Comparable bond strengths were obtained.

EXAMPLE 5

Ninety-five parts of the crystalline polypropylene composition described in Example 1 were blended with 5 parts of a polymerized wood rosin available from Heyden Newport Chemical Corporation as PENROS and having the following characteristics:

Ball and Ring softening point: 107° C.
Capillary Tube melting point: 85° C.
Acid number: 148
Saponification number: 152
Unsaponifiable matter: 14%
Ash content: at <0.02%
Specific gravity at 25°/25° C.: 1.07

Plaques were molded from this composition and, after electroplating, bond strengths of 22–23 lbs./in. were obtained.

EXAMPLE 6

Ninety-five parts of the crystalline polypropylene homopolymer of Example 1 containing the same stabilizers and filler system were dry blended with 5 parts of disproportionated wood rosin (commercially available from Heyden-Newport Chemical Corporation as Nilox U) having the following characteristics:

Ball and Ring softening point: 83° C.
Capillary Tube melting point: 64° C.
Acid number: 158
Saponification number: 162
Unsaponifiable matter: 10%
Ash: at <0.01%
Specific gravity at 25°/25° C.: 1.07

Plaques were molded from the polypropylene blend and subjected to the same electroplating process described in Example 1. Evaluation of the bond strength gave a result of 31 lbs./in.

EXAMPLE 7

Ninety parts of the crystalline propylene polymer described in Example 1 and having the same additive system was dry blended with 10 parts of a tall oil rosin (WW Tall Oil Rosin available from Heyden-Newport Chemical Corporation) having the following properties:

Ring and Ball softening point: 80° C.[1]
Capillary Tube melting point: 60° C.
Acid number: 173
Saponification number: 177
Rosin acids: 91%
Fatty acids: 2%
Esters (approx.): 2%
Unsaponifiable matter: 5%
Ash content: <0.01%

[1] Glycerine bath used.

After forming the composition into molding powder, plaques were molded from the blended composition which were treated by the electroplating method described in Example 1. Equivalent adhesion was obtained.

EXAMPLE 8

The procedure of Example 7 was repeated using the same materials except that the adhesion-promoting modifier was a heat-treated tall oil rosin (available from Heyden Newport Chemical Corporation as Starex having the following characteristics:

Ring and Ball softening point: 73° C.[2]
Capillary Tube melting point: 57° C.
Acid number: 168
Saponification number: 172
Rosin acids: 88.5%
Fatty acids: 2.5%
Esters (approx.): 2%
Unsaponifiable matter: 7%
Ash content: <0.01%

[2] Water bath used.

Several plaques were electroplated and good bond strengths were obtained.

EXAMPLE 9

To 90 parts of the crystalline propylene polymer described in Example 1 and having the same additive and stabilizer system, 10 parts of a gum rosin having a Ring and Ball softening point 73° C., an acid number of 166 and a saponification number of 169 was dry blended and thereafter the composition was extruded and chopped into molding powder. Plaques were compression molded from the modified composition and electroplated according to Example 1. Very good bond strength was obtained.

EXAMPLE 10

Example 9 was repeated except that the polypropylene was dry blended with a natural wood rosin (obtained from extraction of pine wood without further processing) having the following properties:

Ring and Ball softening point: 79° C.
Capillary Tube melting point: 60° C.
Acid number: 162
Saponification number: 167
Specific gravity at 25°/25° C.: 1.07

Molded plaques were electroplated and good bond strength was obtained:

EXAMPLE 11

Following the procedure of Example 1, 85 parts of a crystalline polypropylene polymer having the same additive and stabilizer system described in Example 1 was dry blended with 15 parts of Newtrex wood rosin (available from Heyden Newport Chemical Corporation) having the following properties:

Ring and Ball softening point: 89° C.
Capillary Tube melting point: 68° C.
Acid number: 158
Saponification number: 162
Unsaponifiable matter: 10%
Specific gravity at 25°/25° C.: 1.07

The blended composition was melt extruded and ground into molding powder. Plaques were compression molded and electroplated according to the procedure described in Example 1; similar bond strengths were obtained.

EXAMPLE 12

Example 10 was repeated with the exception that a heat-treated rosin having the following characteristics was employed:

Ring and Ball softening point: 71° C.
Capillary Tube melting point: 54° C.
Acid number: 122
Saponification number: 145
Unsaponifiable matter: 20%
Specific gravity at 25°/25° C.: 1.07

After electroplating, evaluation of the bond strength gave similar results.

EXAMPLE 13

Example 5 was repeated except that 75 parts of the same crystalline propylene polymer was dry blended with 25 parts of polymerized wood rosin. Plaques were compression molded from this composition and firm bond strengths were obtained.

EXAMPLE 14

Ninety parts of a crystalline propylene-ethylene terminal block copolymer having a flow rate of 4.0 and containing the same stabilizing and additive system of Example 3 was dry blended with 10 parts of a wood rosin obtained from the oleo resinous constituents of Southern pine wood and having the following characteristics:

Ring and Ball softening point: 79° C.
Capillary Tube melting point: 50° C.
Acid number: 100
Saponification number: 146
Unsaponifiable matter: 17%
Specific gravity at 25°/25° C.: 1.124

The composition was compression molded into plaques that were subsequently electroplated and evaluation of the bond strength gave very good results.

EXAMPLE 15

To 65 parts of the propylene-ethylene terminal block copolymer described in Example 3, 35 parts of the polyterpene resin described in Example 1 were blended together in a Waring Blendor and thereafter molded plaques were prepared from the composition. Electroplating of the plaques resulted in firm adherency of the metal plate to the polyolefin substrate.

EXAMPLE 16

To 95 parts of the crystalline polypropylene of Example 1 and having the same stabilizer system and other additives, 5 parts were added of a substantially full hydrogenated rosin having a softening point of 92° C. (Hercules Drop method) and that was hydrogenated to the "tetrahydro" stage. The modifier was thoroughly blended with the polypropylene composition and thereafter molded into plaques. Following electroplating, the bond strength corresponding to the values in Example 1.

EXAMPLE 17

Example 1 was repeated except that 5 parts of an ester gum (the glycerol ester of hydrogenated rosin having a melting point of 84° C. as determined by the Hercules Drop method described in Technical Pamphlet 400–341–C and an acid number of approximately 8) were used as the adhesion-promoting modifier. The components were thoroughly dry blended in a two-roll mill and the composition was molded into plaques that were electroplated according to the process in Example 1. The bond strength of the plaques averaged about 22 lbs./in.

EXAMPLE 18

Example 17 was repeated except that the ester gum was the glycol ester of polymerized rosin having a melting point of 116–118° C. (Hercules Drop method) and an acid number of 8–10. After thoroughly blending the components and preparing the electroplated plaques, similar bond strengths were obtained.

EXAMPLE 19

Following the same procedure in Example 1, 85 parts of a crystalline polypropylene polymer having a flow rate of 4.0 but otherwise having the same additive and stabilizer system described in Example 1 was dry blended with 15 parts of dirosin amine. After blending, the composition was extruded and ground into molding powder. Plaques compression molded from the modified composition were electroplated according to Example 1 and good bond strength was achieved.

EXAMPLE 20

The procedure of Example 19 was repeated with the exception that 15 parts of the diamide of a substantially fully hydrogenated rosin and ethylene diamine were blended. Molded plaques were electroplated according to the procedure in Example 1 and a firm bond strength was obtained.

EXAMPLE 21

Example 20 was repeated except that the adhesion-promoting modifier was a monoamide (the N-dehydroabietyl amide of partially hydrogenated rosin having a Hercules Drop softening point of 95° C.). After electroplating molded plaques, a similar bond strength was obtained.

EXAMPLE 22

To 95 parts of a crystalline polypropylene composition containing the same stabilizing system and additives described in Example 1 was added 5 parts of a petroleum hydrocarbon resin that is a mixed alkyl-aromatic resin derived from by-products of a cracking process (commercially available as Piccovar 450 from the Pennsylvania Industrial Chemical Corporation) and has the following characteristics:

Softening point, ° C. _____ 100
Acid number, maximum _____ 1
Saponification number, maximum _____ 1
Specific gravity _____ 1.05
Refractive index _____ 1.60
Flash point, COC, ° C. _____ 216

The blend is molded into plaques which are electroplated and evaluated for adhesion of the metal film to the polyolefin substrate. An average value in excess of 20 lbs/in. was obtained.

EXAMPLE 23

Example 22 was repeated with the same components except that 80 parts of the crystalline polypropylene were employed and 20 parts of the petroleum hydrocarbon resin were used. Following blending and the preparation of electroplated plaques, bond strength determinations were equivalent to those obtained in Example 22.

EXAMPLE 24

To 95 parts of the crystalline polypropylene homopolymer of Example 1 containing the same additives in the same amounts, 5 parts of a water-white thermoplastic copolymer of vinyl toluene and alpha-methyl styrene (a hydrocarbon resin) having a Ring and Ball softening point of 100° C., an acid number less than 1, a saponification number less than 1, a refraction index at 25° C. of 1.583, a flash point of 263° C., and a specific gravity of 1.04 (commercially available as Piccotex 100 from Pennsylvania Industrial Chemical Corporation) were thoroughly blended and the composition extruded and compression molded into plaques. After electroplating, the average bond strength measured 21 lbs./in.

EXAMPLE 25

Example 24 was repeated except that the polyolefin was a propyleneethylene terminal block copolymer having a flow rate of 4.0. Evaluation of the electroplated plaques gave equivalent adhesion.

EXAMPLE 26

Ninety-five parts of the crystalline polypropylene homopolymer of Example 1 containing the same stabilizers and fillers were blended with 5 parts of a hydrogenated petroleum hydrocarbon resin (Piccopale H-2, available from Pennsylvania Industrial Chemical Corporation). This resin is non-aromatic and is prepared by hydrogenating the polymerized product (a petroleum hydrocarbon resin) of various dienes and reactive olefins obtained from petroleum distillates. Considerable cyclic structures are present but no aromatics.

Plaques were molded from the blended composition and after electroplating the average bond strength was 18 lbs./in.

EXAMPLE 27

Example 26 was repeated except that the adhesion-promoting modifier was a terpolymer of styrene, acrylonitrile and indene (Piccoflex 120 available from Pennsylvania Industrial Chemical Corporation) having the following characteristics:

Softening point: 118-123° C.
Acid number, maximum: 1
Saponification number, maximum: 1
Specific gravity: 1.08
Viscosity, melt:
    10 poises at 280° C.
    100 poises at 190° C.

Two plaques were electroplated according to the procedure of Example 1 and the bond strength measured an average value of 23 lbs./in.

EXAMPLE 28

To 90 parts of a propylene-ethylene terminal block copolymer having a flow rate of 5.0 and containing the same stabilizers and fillers of Example 1 was added 10 parts of a petroleum hydrocarbon resin (Picco 6110-3, available from Pennsylvania Industrial Chemical Corporation) having a softening point of 110° C. Good bond strength was obtained between the electroplated metal and the polyolefin substrate.

EXAMPLE 29

Example 28 was repeated except that the adhesion-promoting modifier was a petroleum hydrocarbon resin (Piccopale 100, available from Pennsylvania Industrial Chemical Corporation) having a Ring and Ball softening point of 100° C., an iodine number (corrected) of 60 and a molecular weight of approximately 1400. Plaques were compression molded from the blended composition and, after electroplating, good bond strengths were obtained.

EXAMPLE 30

For comparative purposes, Example 1 was repeated but without the addition of an adhesion-promoting modifier. Molded plaques from this polypropylene were subjected to the same plating cycle of conditioning, sensitizing, activating and electroless plating. Severe blistering occurred.

We claim:

1. A metallized polyolefin shaped article comprising a polyolefin base member and an adherent metal layer bonded to the polyolefin base member wherein said polyolefin base member contains a blend of a polyolefin and from about 1% to about 55% by weight, based on the total weight of said base member, of a compatible adhesion-promoting modified selected from the group consisting of (a) polyterpene resins, (b) rosin acids, (c) disproportionated rosins, (d) polymerized rosins, (e) hydrogenated rosins, (f) dirosin amines, (g) rosin amides, (h) ester gums and (i) petroleum resins having a molecular weight less than about 3,000.

2. A metallized article according to claim 1 wherein said polyolefin is derived from 1-alkenes having from 3 to 8 carbon atoms.

3. A metallized article according to claim 1 wherein said polyolefin is a solid, substantially crystalline propylene polymer.

4. A metallized article according to claim 1 wherein said polyolefin base member contains from about 2.5% to about 15% by weight of a compatible adhesion-promoting modifier.

5. A metallized article according to claim 1 wherein said polyolefin is a solid, substantially crystalline propylene polymer and said adhesion-promoting modifier is a polyterpene resin.

6. A metallized article according to claim 1 wherein said polyolefin is a solid, substantially crystalline propylene polymer and said adhesion-promoting modifier is an ester gum.

7. A metallized article according to claim 1 wherein said polyolefin is a solid, substantially crystalline propylene polymer and said adhesion-promoting modifier is a polymerized rosin.

8. A metallized article according to claim 1 wherein said adhesion promoting modifier has a softening point not less than about 65° C. as determined by the Ring and Ball method.

9. A metallized article according to claim 1 wherein said polyolefin is a solid, substantially crystalline propylene polymer and said adhesion-promoting modifier is a rosin acid.

10. A metallized article according to claim 1 wherein said polyolefin is a solid, substantially crystalline propylene polymer and said adhesion-promoting modifier is a hydrogenated rosin.

11. A metallized article according to claim 1 wherein said polyolefin base member contains from about 1% to about 15% by weight of a compatible adhesion-promoting modifier.

12. A metallized polyolefin shaped article comprising a polyolefin base member and an adherent metal layer bonded to the polyolefin base member wherein said polyolefin base member contains a blend of a polyolefin derived from 1-alkenes having from 3 to 8 carbon atoms and from about 1% to about 15% by weight, based on the total weight of said base member, of a compatible adhesion-promoting modifier selected from the group consisting of rosin acids, disproportionated rosins, polymerized rosins, hydrogenated rosins and ester gums, said adhesion-promoting modifier having a softening point not less than about 65° C. as determined by the Ring and Ball method.

13. A metallized article according to claim 12 wherein said polyolefin is a solid propylene polymer.

14. A metallized article according to claim 12 wherein said polyolefin is a solid propylene polymer and said adhesion-promoting modifier is a rosin acid.

15. A metallized article according to claim 12 wherein said polyolefin is a solid propylene polymer and said adhesion-promoting modifier is a disproportionated rosin.

16. A metallized article according to claim 12 wherein said polyolefin is a solid propylene polymer and said adhesion-promoting modifier is a polymerized rosin.

17. A metallized article according to claim 12 wherein said polyolefin is a solid propylene polymer and said adhesion-promoting modifier is a hydrogenated rosin.

18. A metallized article according to claim 12 wherein said polyolefin is a solid propylene polymer and said adhesion-promoting modifier is an ester gum.

19. A metallized article according to claim 18 wherein said ester gum is selected from the group consisting of the glycerol ester of hydrogenated rosin, the ethylene glycol ester of hydrogenated rosin, the diethylene glycol ester of hydrogenated rosin, the glycerol ester of polymerized rosin and the diethylene glycol ester of polymerized rosin.

References Cited

UNITED STATES PATENTS

| | | | |
|---|---|---|---|
| 3,011,920 | 12/1961 | Shipley, Jr. | 117—47X |
| 3,012,906 | 12/1961 | Anspon | 117—160X |
| 3,313,754 | 4/1967 | Logan | 260—27 |
| 3,326,742 | 6/1967 | Shephard | 117—47X |

ALFRED L. LEAVITT, Primary Examiner

E. G. WHITBY, Assistant Examiner

U.S. Cl. X.R.

117—138.8, 160, 168; 204—14; 106—1, 218; 260—27, 33.2, 876; 161—223

PO-1050
(5/69)

UNITED STATES PATENT OFFICE
CERTIFICATE OF CORRECTION

Patent No. 3,567,487          Dated May 12, 1971

Inventor(s) Wassily Poppe and Habet M. Khelghatian

It is certified that error appears in the above-identified patent and that said Letters Patent are hereby corrected as shown below:

Column 8, line 50: The right parenthesis missing after Starex.

Column 8, line 70: The word "of" omitted after --point--.

Column 9, line 63: In Example 14 in the Table "50°C." should read --59°C.--.

Column 11, line 30: The word "propyleneethylene" should read --propylene-ethylene--.

Column 12, line 25: In Claim 1 the word "modified" should read --modifier--.

Signed and sealed this 24th day of August 1971.

(SEAL)
Attest:

EDWARD M.FLETCHER,JR.
Attesting Officer

WILLIAM E. SCHUYLER, JR.
Commissioner of Patents